United States Patent [19]
Orlewicz et al.

[11] Patent Number: 5,496,008
[45] Date of Patent: Mar. 5, 1996

[54] RUBBER MOLDING APPARATUS

[75] Inventors: Dennis J. Orlewicz; William P. Orlewicz, both of Plymouth; Lawrence W. Orlewicz, Milford, all of Mich.

[73] Assignee: Magnum Manufacturing, Inc., Mich.

[21] Appl. No.: 301,878

[22] Filed: Sep. 7, 1994

Related U.S. Application Data

[62] Division of Ser. No. 28,535, Mar. 8, 1993, Pat. No. 5,362,429.

[51] Int. Cl.$^6$ .................................................. B29C 33/76
[52] U.S. Cl. .................. 249/61; 249/114.1; 249/134; 249/141; 249/144; 425/DIG. 12
[58] Field of Search .................. 249/114.1, 115, 249/134, 61, 144, 141; 425/DIG. 12, 412; 264/221, 317

[56] References Cited

U.S. PATENT DOCUMENTS

| | | | |
|---|---|---|---|
| 2,280,074 | 4/1942 | Halsall | 264/317 |
| 2,303,092 | 11/1942 | Raphael | 249/114.1 |
| 2,986,797 | 6/1961 | Aisenberg | 249/115 |
| 3,248,758 | 5/1966 | Schmitz et al. | 249/134 |
| 3,524,618 | 8/1970 | Collman et al. | 264/221 |
| 3,873,654 | 3/1975 | Smith | 264/455 |
| 3,879,245 | 4/1975 | Fetherston et al. | 264/241 |
| 4,125,351 | 11/1978 | Alfter et al. | 249/134 |
| 4,209,564 | 6/1980 | Nomura et al. | 264/46.6 |
| 4,242,410 | 12/1980 | König et al. | 264/46.6 |
| 4,424,183 | 1/1984 | Nelson | 264/317 |
| 4,538,787 | 9/1985 | Fox et al. | 249/115 |
| 4,681,724 | 7/1987 | Faiz et al. | 249/115 |
| 4,906,423 | 3/1990 | Frisch | 264/317 |
| 5,116,557 | 5/1992 | Debaes et al. | 264/46.6 |

FOREIGN PATENT DOCUMENTS

| | | | |
|---|---|---|---|
| 3410414 | 10/1985 | Germany | 264/317 |
| 58-107313 | 6/1983 | Japan | 264/317 |

OTHER PUBLICATIONS

*Mold–Making Handbook,* (1983) MacMillan Publishing Co., pp. 261–264.

Primary Examiner—Robert B. Davis
Attorney, Agent, or Firm—Alex Rhodes

[57] ABSTRACT

An apparatus for molding experimental, prototype and replacement parts from rubber materials. The apparatus consists of a mold having walls made from layers of fiberglass cloth and laminating resin reinforced with a mixture of quartz sand and laminating resin; a frangible cellular core made of a two component system polyurethane foam core and a hard outer coating of a quick set resin; a wax; and a release agent. The frangible core is formed by coating the surfaces of a core forming cavity of a core box with the wax to fill in irregularities; buffing the wax coating to provide a smooth finish; applying the release agent over the wax; coating the release agent with the hard quick set resin; and filling the core forming cavity with the two component system polyurethane foam. The frangible core is inserted in the mold, a rubber polymer is injected into the mold and the frangible core is removed from the part by breaking the core into small pieces after the part is removed from the mold.

8 Claims, 3 Drawing Sheets

RUBBER MOLDING APPARATUS

This is a division of application Ser. No. 08/028,535, filed on Mar. 8, 1993 and now U.S. Pat. No. 5,362,429.

FIELD OF THE INVENTION

This invention relates to an apparatus and which is particularly adapted for molding small quantities of experimental, prototype and replacement parts from rubber materials.

BACKGROUND OF THE INVENTION

Rubber parts are commonly made by compressing, injecting or extruding rubber materials in metal molds and dies. One aspect of the prior art is that experimental, prototype and replacement rubber parts with deep undercuts, re-entrant curves and convolutions require precision metal molds and split or collapsing cores.

Another aspect of the prior art is that long lead times and high costs are incurred in procuring complex experimental, prototype and replacement parts made from rubber materials. Another aspect of the prior art is that tests are often delayed until production molds are available because of the high costs and long lead times for procuring prototype parts with temporary molds.

Delays in testing prototype parts increase the risk of expensive changes to production molds.

Another aspect of the prior art is that equipment is sometimes obsoleted because replacement parts are not available or too expensive.

SUMMARY OF THE INVENTION

The present invention is an apparatus for molding experimental, prototype, and replacement parts. The apparatus may also be used for molding small quantities of production rubber parts. The invention resides in a novel construction of a mold and core and a frangible cellular core coated with a hard quick set resin which is broken into small pieces and removed from the part after the part is removed from the mold.

One benefit of the invention is reduced cost. Another benefit is that the time for procuring rubber parts is reduced. An additional benefit of the invention is that parts which are produced with the invention closely simulate parts made in expensive production steel molds and split or collapsing cores in accuracy, appearance and physical properties.

Another benefit of the invention is that collapsing cores are not required for molding rubber parts with deep undercuts, re-entrant curves or convolutions.

The apparatus is comprised of a mold made from layers of fiberglass cloth and laminating resin reinforced with a mixture of quartz sand and laminating resin and a frangible cellular core coated with a thin hard resin.

The steps in forming the frangible core comprise the steps of applying a wax coating to the surfaces of a core forming cavity of a core box to fill in irregularities; buffing the wax coating to provide a smooth finish; applying a release agent over the wax; coating the release agent with a thin hard resin; and filling the core forming cavity with a two component system polyurethane foam.

Further benefits and features of the invention will be apparent from the ensuing description and accompanying drawings which describe the invention in detail. A preferred embodiment is disclosed in accordance with the best mode which is contemplated for practicing the invention and the specific features in which exclusive property rights are claimed are set forth in each of the numbered claims which are appended to the detailed description.

DETAILED DESCRIPTION OF THE PREFERRED EMBODIMENT

Figure 1:
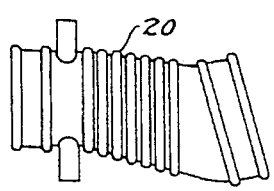
FIG. 1 is a plan view of a rubber air duct for an automobile.
Figure 2:
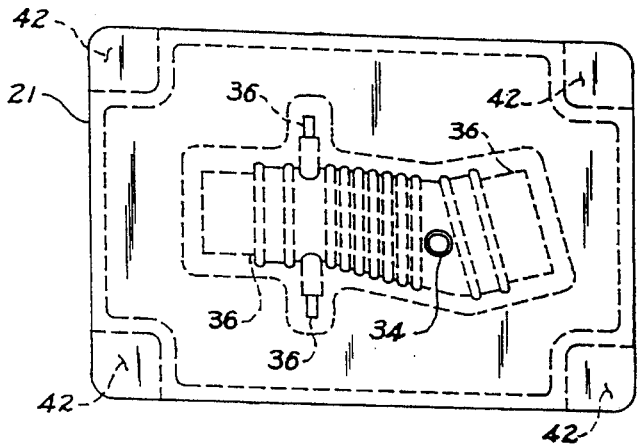
FIG. 2 is a plan view of a mold for making the air duct which embodies the present invention.
Figure 3:
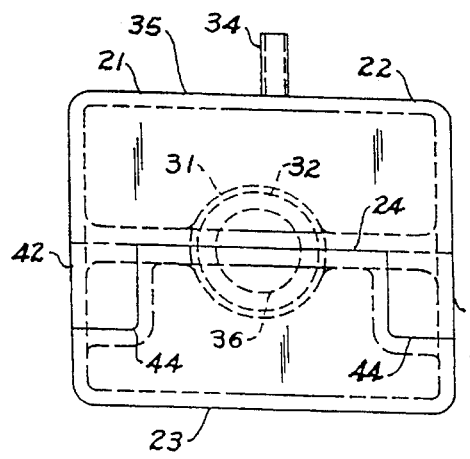
FIG. 3 is a right side view of the mold.
Figure 4:
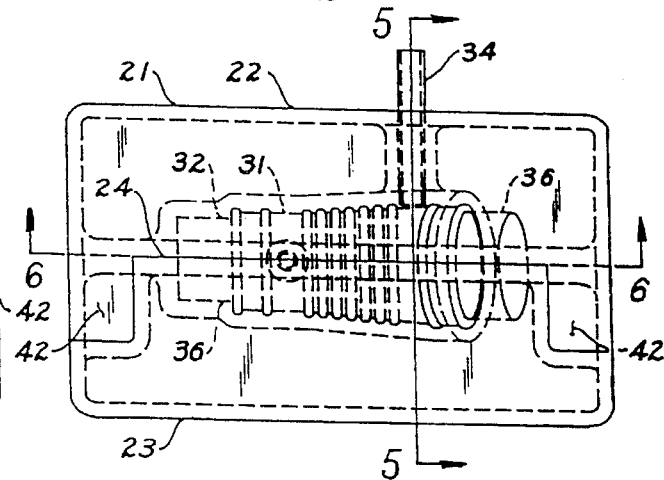
FIG. 4 is a front view of the mold.
Figure 5:
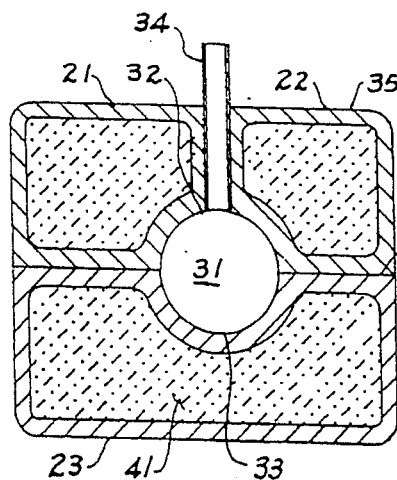
FIG. 5 is a cross-sectional view through the mold taken on the line 5—5 of FIG. 4.
Figure 6:
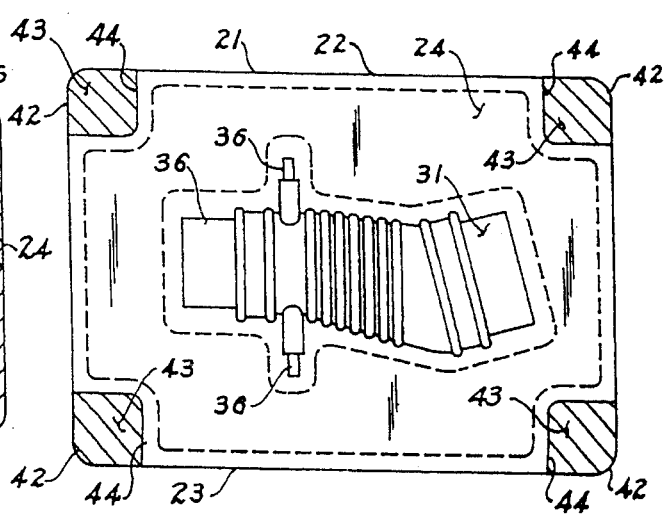
FIG. 6 is a cross-sectional view through the mold taken on the line 6—6 of FIG. 4.

Referring now to the drawings wherein like numerals designate like and corresponding parts throughout the several views, an automobile rubber air duct 20 with convolutions and re-entrant angles is shown in FIG. 1. The air duct 20 is exemplary of the complex parts which can be molded with the present invention. Heretofore, procurements of complex experimental and prototype parts made from rubber materials required long lead times and expensive tooling.

A mold for making the automobile air duct which embodies the present invention is illustrated in FIGS. 2 through 8, inclusive. The mold 21 is a rectangular shaped assembly comprised of upper 22 and lower 23 portion lay-ups of fiber glass cloth and laminating resin. In the mold 21, which is depicted in the drawings, the upper 22 and lower 23 portions contact each other along a horizontal plane 24 resulting in what is commonly designated as a parting line. It should be noted that a horizontal parting line is not a requirement of our invention and that for some parts an irregular parting line may be required. Except as otherwise specified herein, a model of the air duct and conventional shop practices are used for making the upper 22 and lower 23 mold portions.

The outside shape of the air duct 20 is formed in a cavity, one portion of which is in the upper mold portion bottom wall 32 and the other of which is in the lower mold portion top wall 33.

In the upper mold portion 22 there is a tubular port 34 for injecting a rubber polymer to form the rubber air duct 20. The port 34 extends from the top wall 35 of the upper portion 22 to the cavity 31 which forms the outside of the air duct 20. At the perimeter of the mold cavity 31 are depressions 36 commonly referred to as core prints for supporting a core 37 which forms the inside of the air duct 20. The core prints 36 engage core supports 38 which will be later described.

Extending outwardly from the right side of the mold cavity 31 along the bottom wall 32 of the upper mold portion 22 and along the top wall 35 of the lower mold portion 23 are small narrow grooves 39 which form apertures 40 for exhausting air from the cavity 31 when a rubber material is injected under pressure through the tubular port 34 into the mold 21. One feature of the mold 21 which is believed to be novel is that the interiors of the upper 22 and lower 23 mold portions are filled with a mixture 41 of quartz sand and laminating resin. The quartz sand and epoxy resin mixture 41 results in a massive and rigid mold 21, an important factor for producing accurate parts.

The upper 22 and lower 23 mold portions are aligned with corner guides 42 at each corner of the mold 21. The corner guides 42 consist of rectangular male portions 43 which extend downwardly from the upper mold portion 22 and rectangular female portions 44 in the corners of the lower mold portion 23. The corner guides 42 accurately align the upper 22 and lower 23 mold portions.

Figure 7:
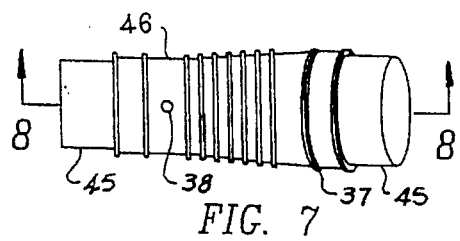
FIG. 7 is a view of a core for making the air duct which embodies the present invention.
Figure 8:
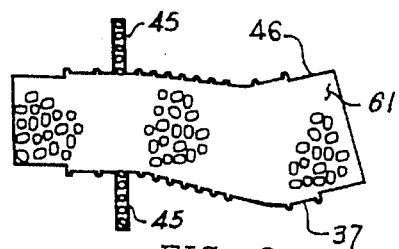
FIG. 8 is a cross-sectional view through the core taken on the line 8—8 of FIG. 7.
Figure 9:
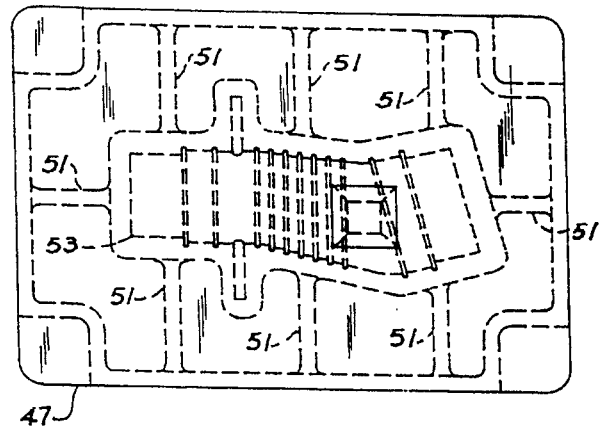
FIG. 9 is a plan view of a core box for making the core.
Figure 10:
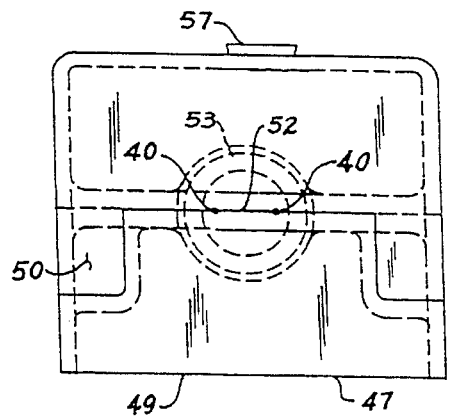
FIG. 10 is a right side view of the core box.
Figure 11:
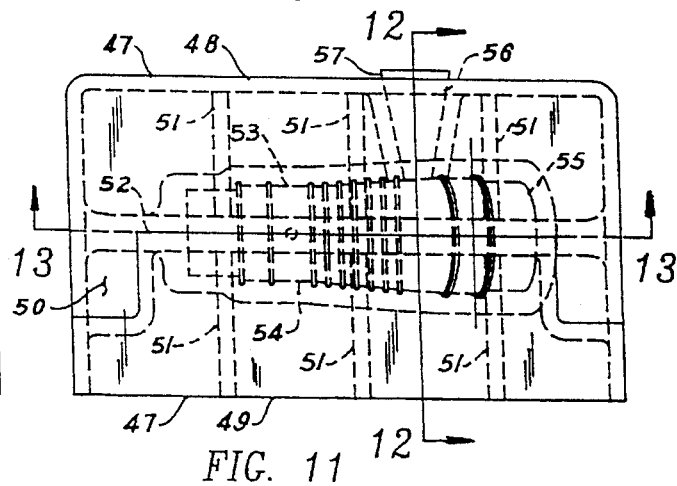
FIG. 11 is a front view of the core box.
Figure 12:
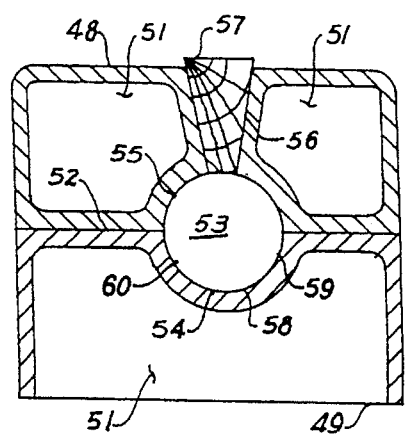
FIG. 12 is a cross-sectional view through the core box taken on the line 12—12 of FIG. 11.
Figure 13:
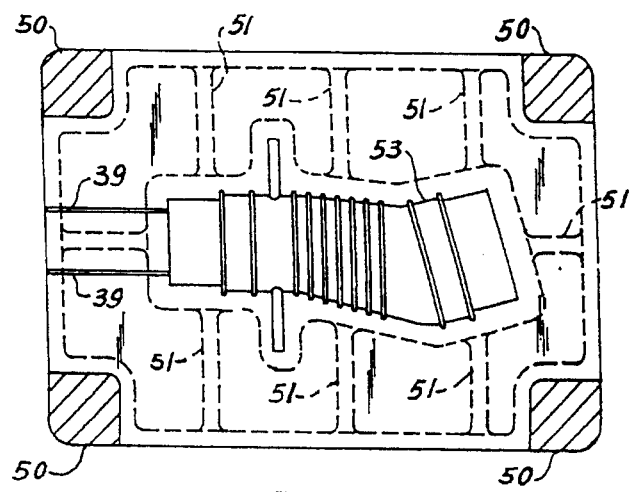
FIG. 13 is a cross-sectional view through the core box taken on the line 13—13 of FIG. 11.
Figure 14:
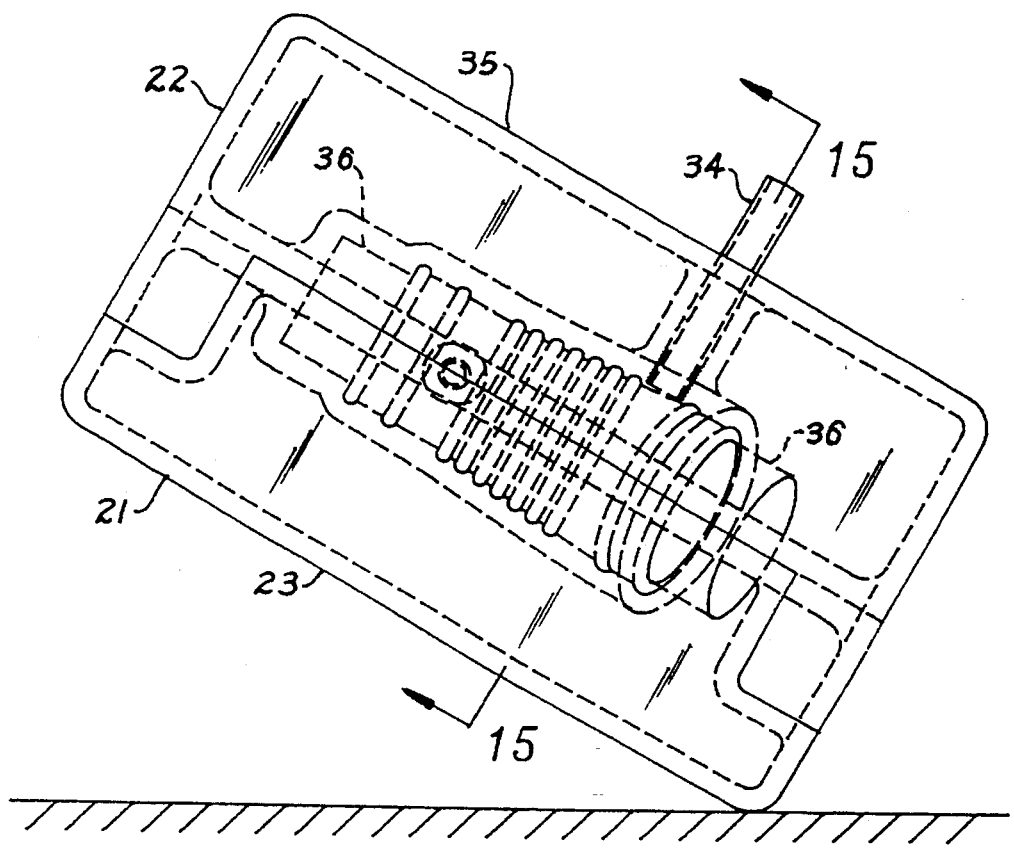
FIG. 14 is a front view of the mold and core drawn to an enlarged scale in a tilted position for injecting a polymer for forming the rubber air duct.
Figure 15:
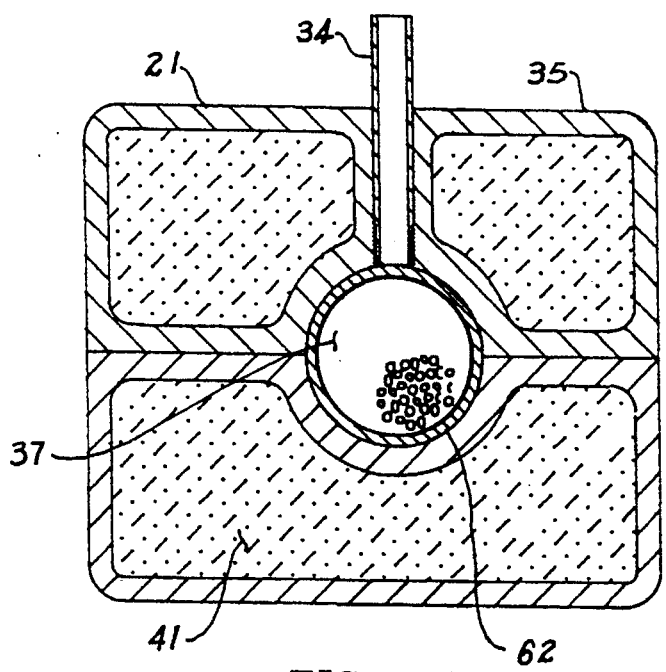
FIG. 15 is a cross-sectional view through the mold and core taken on the line 15—15 of FIG. 14.

The frangible core 37, an essential element of the present invention, is illustrated in FIG. 7 and 8. At the ends of the core 37 are core supports 45 which engage the core prints 36 and support the core 37 in the mold 21.

The core 37 is a rigid cellular member with a thin hard outer coating 46. Except as otherwise specified herein, conventional shop practices are used for constructing the core 37. With reference to FIGS. 9 through 13, inclusive, the core box 47 is comprised of an upper portion 48 and a lower portion 49. The upper 48 and lower 49 portions of the core box 47 are lay ups of the same type of fiber glass cloth and laminating resin as the mold 21.

At the corners of the core box 47 are corner guides 50 of similar construction as the mold 21. In the interiors of the core box 47 are ribs 51 which increase the rigidity of the core box 47. The upper 48 and lower 49 core box portions contact along a horizontal plane 52. One portion of a core forming cavity 53 is in the lower wall 54 of the upper core box portion 48 and the other portion of the cavity 53 is in the top wall 55 of the lower core box portion 49.

In the upper portion 48 of the core box 47 there is a tapered port 56 for filling the core 37. The tapered port 56 is sealed with a removable closely fitting tapered wooden wedge 57. For larger and/or more complex parts, more than one tapered port 56 may be required.

The method for molding the air duct 20 consists of preparing the mold 21, making the frangible core 37 and molding the rubber part.

The mold 21 is prepared in the following manner. A thin coating of paste wax 58 is applied by hand to the surfaces of the cavity 31 in the upper 22 and lower 23 portions of the mold 21 which form the outside of the air duct 20. One suitable wax is the "SC JOHNSON PASTE WAX" of SC Johnson & Son, Inc. of Racine Wis. 53403. The paste wax 58 is allowed to dry and then hand buffed with a soft tern cloth. The purpose of the paste wax is to fill in irregularities and provide a smooth production like outside surface on the air duct 20.

After the hand rubbing of the paste wax, a mold release agent 59 is sprayed over the entire surface of the paste wax 58. The mold release agent 59 which has been used in practicing the invention is the "CHEM-TREND" CT-88 release agent, of Chem-Trend Incorporated, Howell, Mich. 48843.

The core 37 is made in the following manner. The tapered wedge 57 is removed from the upper core box portion 48. The cavity 53 in the upper 48 and lower 49 portions of the core 37 are coated with the same type of paste wax 58 as the mold 21 and polished with a soft tern cloth. The same type of mold release agent 59 is sprayed over the paste wax 58. After the release agent 59 has been applied over the paste wax 58, a quick set resin 60 is applied by hand with a brush over the entire surface of the mold release agent 59.

The quick set resin 60 which has been used is the "FR-30-A Quick Set Adhesive" of the Fiber-Resin Corporation, Warren, Mich. "FR-30-A Quick Set Adhesive" is an epoxy resin system comprised of over 90 percent of Bisphenol A Diglycidyl Ether Resin (Cas No. 25068-38-6). The resin 60 forms a thin hard non-porous layer in the core forming cavity 53.

After the quick set resin 60 is applied over the mold release agent 59, the upper 48 and lower 49 portions of the core box 47 are tightly clamped together with a "C" clamp (not shown) or by some other conventional clamping means. A two component system polyurethane foam 61, such as, Ireson's polyurethane foam "Rigid-Resin 721" and "Rigid-Catalyst #800", manufactured by Foamseal, Inc., Oxford, Mich. 48371 is prepared by mixing the catalyst with the resin as per the directions supplied with the product.

The mixture 61 of "Rigid-Resin 721" and "Rigid-Catalyst #800" is stirred vigorously for about thirty seconds and an amount of mixture equal to approximately one third the volume of the core 37 is poured through the tapered port 56 and the port 56 is immediately sealed with the wooden wedge 57 whereby the mixture 61 is allowed to foam and expand inside of the core box 47.

As the mixture 61 expands, it contacts and adheres to the thin layer of quick set resin 60 to provide a frangible and rigid cellular core 37 with a thin hard non-porous outer coating. The density of cores 37, which have been made in accordance with the described method, has been determined to be within a range of approximately 2.5 to 3.5 pounds per cubic foot. Higher densities are undesirable because they increase the difficulty of removing the core 37 from the finished part 20. However, it should be noted that for very thin sections it may be necessary to increase the density regardless of the difficulty of core removal.

After the core 37 has been removed from the core box 47, excess cellular material at the port 56 is trimmed from the core 37 and the exposed cellular portion of the core 37 is coated with the quick set resin 60. The core 37 is placed in the mold 21 supported on the core supports 38. The mold 21 is then closed and the upper 22 and lower 23 mold portions clamped together with conventional "C" clamps (not shown) or some other clamping means. A two part synthetic polymer 62 is injected under pressure through the tubular port 34 using the two-part injection cartridge gun "TS530" (not shown) marketed by Techcon Systems, Inc., Carson, Calif. 90746.

The final steps consist of removal of the air duct 20 and core 37 from the mold 21 and removal of the core 37 from the air duct 20. The air duct 20 and core 37 are removed by separating the upper 22 and lower 23 portions of the mold 21 and the core 37 is removed by breaking the frangible urethane cellular core 37 into small pieces. Removal of cores 37 with densities within the 2.8 to 3.2 pounds per cubic foot range has required only modest efforts.

The two component polymer, namely, the Enichem two part ECTR Resin of the EniChem Polyurethane Division, Conyers, Ga. has produced rubber parts with appearance and physical properties which were very close to production parts. Enchem ECF-65A is a two component hybrid polyurea system which sets at room temperatures. The physical properties of prototype parts made from this material were as follows.

Tensile Strength (psi) 3,500

Flexural Modulus 30,000

% Elongation 500

Shore Hardness 65A

Notched Isod Impact Ft-lbs 9

Heat Sag—259° F. (in.)

6 In. Overhang 0.1

From the foregoing, it will be appreciated that the present invention provides an efficient, economical and timely means for making experimental, prototype, replacement and low volume production parts.

Although but a single embodiment of our method has been illustrated and described, it is not our intention to limit our invention to this embodiment, since other embodiments are possible by changes in material, steps and sequence of steps which are known to ordinary persons skilled in the art.

We claim:

1. An apparatus for molding complex parts from rubber materials comprising: a mold assembly comprised of an upper portion and a lower portion; a frangible unitary core suspended inside of said mold between upper and lower portions of said mold, said core comprising a rigid cellular material covered with a thin coating of a hard non-porous quick set resin.

2. The molding apparatus recited in claim 1 wherein said core has a density which is within a range of 2.5 to 3.5 pounds per cubic ft.

3. The molding apparatus recited in claim 1 wherein said cellular material of said core is a rigid polyurethane foam.

4. The molding apparatus recited in claim 1 wherein said upper and lower portions of said mold assembly are comprised of outer walls made from lay-ups of fiber glass cloth and a laminating resin and a mixture of quartz sand and laminating resin inside of said outer walls for increasing the rigidity of said upper and lower mold portion.

5. An apparatus for molding complex parts from rubber materials comprising: a mold assembly comprised of an upper portion and a lower portion; a frangible unitary core suspended inside of said mold, said core comprising a rigid cellular material covered with a thin coating of a hard non-porous quick set resin wherein said quick set resin is comprised of over 90 percent of Bisphenol A Diglycidyl Ether Resin.

6. An apparatus for molding complex parts from rubber materials comprising: a mold assembly comprised of an upper portion and a lower portion and a frangible unitary core suspended inside of said mold wherein said unitary core has a density within the range of 2.5 to 3.5 pounds per cubic foot and is comprised of a rigid polyurethane foam covered with a thin quick set resin comprised of over 90 percent of Bisphenol A Diglycidyl Ether Resin.

7. The molding apparatus recited in claim 1 wherein said mold assembly has a generally rectangular shape, and said upper and lower portions of said mold assembly are made from lay-ups of fiberglass cloth and laminating resin and each are comprised of a top wall, side walls, a front wall and a bottom wall, said upper portion having a tubular port extending from upper portion's top wall to said bottom wall for injecting a rubber material, and said upper and lower portions having a means for exhausting air when said rubber material is injected into said mold.

8. The molding apparatus recited in claim 7 further comprising corner guides at the corners of said mold for aligning said upper mold portion with said lower mold portion, each of said corner guides comprising a rectangular male portion extending downward from said upper portion and a rectangular female portion for receiving said male portion.

* * * * *